US006490618B1

(12) United States Patent
Ferguson et al.

(10) Patent No.: US 6,490,618 B1
(45) Date of Patent: Dec. 3, 2002

(54) METHOD AND APPARATUS FOR SNA/IP CORRELATION IN A MIXED APPN AND DLSW NETWORK

(75) Inventors: Darin Ferguson, Raleigh; Robert Clouston, Cary; Anthony Talerico, Wake Forest, all of NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/315,551

(22) Filed: May 20, 1999

(51) Int. Cl.$^7$ .............................................. G06F 15/173
(52) U.S. Cl. ...................... 709/223; 709/224; 709/227; 709/238; 709/249; 709/258; 370/401; 370/402; 370/362; 370/462
(58) Field of Search ................................. 709/223, 224, 709/238, 249, 227, 258; 370/401, 402, 362, 462, 261, 262, 263, 405, 60

(56) References Cited

U.S. PATENT DOCUMENTS

| 4,644,532 A | 2/1987 | George et al. ............... 370/94 |
| 4,827,411 A | 5/1989 | Arrowood et al. ........... 364/300 |
| 4,864,559 A | 9/1989 | Perlman ..................... 370/60 |
| 4,893,307 A | 1/1990 | McKay et al. .............. 370/94.1 |
| 5,021,949 A | 6/1991 | Morten et al. .............. 364/200 |
| 5,027,350 A | 6/1991 | Marshall ................... 370/85.13 |
| 5,142,622 A | 8/1992 | Owens ...................... 395/200 |
| 5,361,256 A | 11/1994 | Doeringer et al. ........... 370/60 |
| 5,371,852 A | 12/1994 | Attanasio et al. ........... 395/200 |
| 5,394,402 A | 2/1995 | Ross ........................ 370/94.1 |
| 5,473,608 A | 12/1995 | Gagne et al. ............... 370/85.13 |
| 5,491,796 A | 2/1996 | Wanderer et al. ........... 395/200.09 |
| 5,511,168 A | 4/1996 | Perlman et al. ............. 395/200.15 |
| 5,517,622 A | 5/1996 | Ivanoff et al. .............. 395/200.13 |
| 5,612,959 A | 3/1997 | Takase et al. ............... 370/390 |
| 5,617,421 A | 4/1997 | Chin et al. ................. 370/402 |
| 5,675,740 A | 10/1997 | Heimsoth et al. ............ 395/200.12 |
| 5,678,006 A | 10/1997 | Valizadeth et al. .......... 395/200.02 |
| 5,684,800 A | 11/1997 | Dobbins et al. ............. 370/401 |
| 5,684,988 A | 11/1997 | Pitchaikani et al. ......... 395/615 |
| 5,694,595 A | 12/1997 | Jacobs et al. ............... 395/609 |
| 5,740,171 A | 4/1998 | Mazzola et al. ............. 370/392 |
| 5,742,604 A | 4/1998 | Edsall et al. ............... 370/401 |
| 5,752,003 A | 5/1998 | Hart ......................... 395/500 |
| 5,764,636 A | 6/1998 | Edsall ....................... 370/401 |
| 5,796,732 A | 8/1998 | Mazzola et al. ............. 370/362 |
| 5,802,053 A | 9/1998 | Bollella et al. ............. 370/401 |

(List continued on next page.)

OTHER PUBLICATIONS

World Wide Web page://www.cisco.com/univercd/cc/td/doc/cisintwk/ito_doc/dlsw.html, *Data–Link Switching (DLSw)*, Feb. 23, 1999, pp. 1–8.

(List continued on next page.)

*Primary Examiner*—Thomas Lee
*Assistant Examiner*—Jingsong Hu
(74) *Attorney, Agent, or Firm*—Cesari & McKenna, LLP

(57) ABSTRACT

A technique efficiently correlates information pertaining to entities of a mixed Advanced Peer to Peer Networking (APPN) and Data Link Switching (DLSW) computer network. The entities comprise System Network Architecture (SNA) host mainframe ("host") and physical unit (PU) entities, along with DLSw and APPN/DLSw devices. The technique involves identifying a SNA session path as using Dependent Logical Unit Requester (DLUR) services of the APPN/DLSw device and thereafter obtaining media access control (MAC)/service access point (SAP) information needed to correlate the SNA session to the DLSw peer devices. The inventive technique then proceeds to efficiently correlate information relating to the DLUR and PU with information relating to the devices to draw the mixed network topology needed to assist in problem isolation.

20 Claims, 9 Drawing Sheets

U.S. PATENT DOCUMENTS

| | | | | |
|---|---|---|---|---|
| 5,802,313 | A | | 9/1998 | Mitchell et al. ........ 395/200.68 |
| 5,835,728 | A | | 11/1998 | Shinomiya et al. .... 395/200.72 |
| 5,845,081 | A | | 12/1998 | Rangarajan et al. ... 395/200.54 |
| 5,909,550 | A | * | 6/1999 | Shankar et al. ........ 395/200.57 |
| 6,084,879 | A | * | 7/2000 | Berl et al. ................... 370/389 |
| 6,154,446 | A | * | 11/2000 | Kadambi et al. ........... 370/239 |
| 6,154,743 | A | * | 11/2000 | Ieung et al. ................... 707/10 |
| 6,172,981 | B1 | * | 1/2001 | Cox et al. .................... 370/401 |
| 6,216,167 | B1 | * | 4/2001 | Momirov .................... 709/238 |

OTHER PUBLICATIONS

World Wide Web page //www.cisco.com/warp/public/558/16.html, *Cisco Catalyst Workgroup Switch Version 3.0*, Jul. 15, 1998, pp. 1–5.

World Wide Web page //www.cisco.com/warp/public/539/7.html, *Cisco VLAN Roadmap*, Jul. 15, 1998, pp. 1–9.

Draft Standard for Virtual Bridged Local Area Networks, P802.1Q/D6, May 16, 1997, pp. 1–10, 70–72.

IAC Newsletter Database, *Cisco Announces New Fast Ethernet Interface*, Apr. 15, 1995, pp. 2–3.

IAC Newsletter Database, *Cisco Announces Token–Ring Switching Products*, Apr. 15, 1995, pp. 4–5.

Wells, et al., DLSw Standardwk, *Data Link Switching: Switch–to–Switch Protocol*, Apr. 1995, pp. 1–91.

Wold Wide Web page://www.cisco.dk/warp/public/100/44.html, *SNA Internetworking*, May 10, 1999, pp. 1–5.

World Wide Web page://www.cisco.com/warp/public/558/61.html, *Cisco Channel Interface Processor*, May 10, 1999, pp. 1–10.

World Wide Web page://www.cisco.com/warp/public/614/2.html, *DLSw and DLSw+*, Sep. 28, 1999, pp. 1–8.

* cited by examiner

METHOD AND APPARATUS FOR SNA/IP CORRELATION IN A MIXED APPN AND DLSW NETWORK

CROSS-REFERENCE TO RELATED APPLICATIONS

The present invention is related to the following copending and commonly assigned U.S. Patent Applications:

U.S. patent application Ser. No. 08/999,271, now U.S. Pat. No. 6,131,117 titled Technique for Correlating Logical Names with IP Addresses on Internetworking Platforms, by Wayne Clark et al., filed on Dec. 29, 1997;

U.S. patent application Ser. No. 09/315,550 still pending titled, Method and Apparatus for SNA/IP Correlation with Multiple DLSw Peer Connections, by Darin Ferguson et al., filed herewith;

U.S. patent application Ser. No. 09/315,441 still pending titled, Method and apparatus for Determining SNA Sessions Using Various Protocols for Transport Based on Filter Criteria, by Darin Ferguson et al., filed herewith;

U.S. patent application Ser. No. 09/315,443 still pending titled, Method and Apparatus for Determining a Path for a Session Using Various Protocols for Transport, by Darin Ferguson et al., filed herewith; and U.S. patent application Ser. No. 09/315,284 still pending titled, Method and Apparatus for Establishing a Database Used for Correlating Information Gathered via SNMP, by Darin Ferguson et al., filed herewith, each application of which is hereby incorporated by reference as though fully set forth herein.

FIELD OF THE INVENTION

The present invention relates to computer networks and, more particularly, to management of entities in a mixed Advanced Peer to Peer Networking (APPN) and Data Link Switching (DLSW) computer network.

BACKGROUND OF THE INVENTION

Data communications in a computer network involves the exchange of data between two or more entities interconnected by communication links and subnetworks. These networks are typically software programs executing on hardware computer platforms which, depending on their roles within a network, may serve as host stations, end stations or intermediate stations. Examples of intermediate stations include routers, bridges and switches that interconnect communication links in subnetworks; an end station may be a computer located on one of the subnetworks. More generally, an end station connotes a source of or target for data that typically does not provide routing or other services to other computers on the network. A local area network (LAN) is an example of a subnetwork that provides relatively short-distance communication among the interconnected stations; in contrast, a wide area network (WAN) facilitates long-distance communication over links provided by public or private telecommunications facilities.

End stations typically communicate by exchanging discrete packets or frames of data according to predefined protocols. In this context, a protocol represents a set of rules defining how the stations interact with each other to transfer data. Such interaction is simple within a LAN, since these are typically "multicast" networks: when a source station transmits a frame over the LAN, it reaches all stations on that LAN. If the intended recipient of the frame is connected to another LAN, the frame is passed over a routing device to that other LAN. Collectively, these hardware and software components comprise a communications network and their interconnections are defined by an underlying architecture.

Most computer network architectures are organized as a series of hardware and software levels or "layers" within each station. These layers interact to format data for transfer between, e.g., a source station and a destination station communicating over the network. Specifically, predetermined services are performed on that data as it passed through each layer, and the layers communicate with each other by means of the predefined protocols. This design permits each layer to offer selected services to other layers using a standardized interface that shields the other layers from details of actual implementation of the services. The lower layers of these architectures are generally standardized and implemented in hardware and firmware, whereas the higher layers are usually implemented in the form of software. Examples of such communications architectures include the System Network Architecture (SNA) developed by International Business Machines (IBM) Corporation and the Internet Communications Architecture.

The Internet architecture is represented by four layers termed, in ascending interfacing order, the network interface, internetwork, transport and application layers. The primary internetwork layer protocol of the Internet architecture is the Internet Protocol (IP). IP is primarily a connectionless protocol that provides for internetworking routing, fragmentation and reassembly of exchanged packets-generally referred to as "datagrams" in an Internet environment-and which relies on transport protocols for end-to-end reliability. An example of such a transport protocol is the Transmission Control Protocol (TCP), which is implemented by the transport layer and provides connection-oriented services to the upper layer protocols of the Internet architecture. The term TCP/IP is commonly used to denote this architecture; the TCP/IP architecture is discussed in *Computer Networks*, 3rd edition, by Andrew S. Tanenbaum, published by Prentice-Hall, PTR in 1996, all disclosures of which are incorporated herein by reference, particularly at pages 28–54.

SNA is a communications framework widely used to define network functions and establish standards for enabling different models of IBM computer to exchange and process data. SNA is essentially a design philosophy that separates network communications into several layers termed, in ascending order, the physical control, the data link control, the path control, the transmission control, the data flow control, the presentation services and the transaction services layers. Each of these layers represents a graduated level of function moving upward from physical connections to application software.

In the SNA architecture, the data link control layer is responsible for transmission of data from one end station to another. Bridges or devices in the data link control layer that are used to connect two or more LANs so that end stations on either LAN are allowed to access resources on the LANs. Connection-oriented services at the data link layer generally involve three distinct phases: connection establishment, data transfer and connection termination. During connection establishment, a single path or connection, e.g., an IEEE 802.2 logical link control type 2 (LLC2) or "data link control" (DLC) connection, is established between the source and destination stations. Once the connection has been established, data is transferred sequentially over the path and, when the LLC2 connection is no longer needed, the path is terminated. Reliable communication of the LLC2 (DLC) is well known and described by Andrew Tanenbaum in his book *Computer Networks, Second Edition*, published in 1988, all disclosures of which are incorporated herein by reference, especially at pages 253–257.

FIG. 1 is a schematic block diagram of a conventional computer network 100 having a host computer coupled to a Token Ring (TR) network TR1 and an end station coupled to TR2. The TR networks are of the type that support Source/Route Bridging (SRB) operations with respect to the contents of a routing information field (RIF) of a frame. The host computer is preferably a SNA host entity comprising a host mainframe computer 110 coupled to a channel-attached router or front end processor (FEP), hereinafter referred to as the "host network connection" 112; in addition, the end station is an SNA entity 114 comprising a "physical unit" (PU), i.e., a component that monitors the station's resources, and a "logical unit" (LU) which consists of logical services by which a user may access the SNA network. An SRB bridging device B1 interconnects TR1 and TR2 such that the SRB network 100 effectively functions as a LAN.

The PU entity communicates with the host by exchanging TR frames over LLC2 connections or sessions through the SRB network. Each TR frame 120 includes a RIF 122 that contains source route information in the form of ring number/bridge number pair "hops" within a path between the stations. For example, the RIF 122 of TR frame 120 transmitted by the PU to host contains [0021.0010]. An LLC2 session is established between the stations using a special TR frame, called an explorer frame.

The explorer frame is used by a source (PU) to "discover" the path to a destination (host); thereafter, a Set Asynchronous Balanced Mode Extended (SABME) frame is sent from the PU to the host to establish a logical connection between the end stations, and the host responds to the SABME frame with an Unnumbered Acknowledgment (UA) frame. Once the UA frame is received by the PU, a connection is established between the source and destination, and these stations communicate by exchanging TR information (INFO) and acknowledgment frames until the logical link SNA session is completed.

For example, the PU transmits an INFO frame over TR2 and through BRI and TR1 to the host. Upon successfully receiving the INFO frame, the host responds by transmitting an LLC2 Receive/Ready (RR) acknowledgment frame over the SRB network to the PU. This INFO/RR exchange continues until the PU has successfully transmitted all of its data and the host has successfully received all of that data. Session completion is then initiated by a Disconnected Mode (DM) frame being transmitted from the PU to the host; the disconnection is thereafter acknowledged by the host responding with a UA frame. The LLC2 frames (packets) are described by Radia Perlman in her book *Interconnections, Bridges and Routers*, published by Addison Wellesly Publishing Company, in 1992, all disclosures in which are incorporated herein by reference, particularly at pages 33–34.

In a SNA network, applications executing on end stations typically access the network through LUs of the stations; accordingly, in a typical SNA network, a communication session may connect two LUs in a LU—LU session. Activation and deactivation of such a session is addressed by Advanced Peer to Peer Networking (APPN) functions. The APPN functions generally include session establishment and session routing within an APPN network. FIG. 2 is a schematic block diagram of an APPN network 200 comprising two end stations, which may be configured as a host network connection entity 202 and a PU entity 212, coupled to token ring (TR) LANs TR1–2, respectively. During session establishment, an end station (such as PU 212) requests an optimum route for a session between two LUs; this route is calculated and conveyed to PU 212 by an intermediate station (e.g., station 216) via a LOCATE message exchange through the network 200. Thereafter, a "setup" or BIND message is forwarded over the route to initiate the session. The BIND includes information pertaining to the partner LU requested for the session.

Intermediate session routing occurs when the intermediate stations 206, 216, configured as APPN network nodes (NN), are present in a session between the two end nodes. As can be seen, the APPN network nodes are further interconnected by a WAN 210 that extends the APPN architecture throughout the network. The APPN network nodes forward packets of an LU—LU session over the calculated route between the two APPN end nodes. An APPN network node is a full-functioning APPN router node having all APPN base service capabilities, including session services functions. An APPN end node, on the other hand, is capable of performing only a subset of the functions provided by an APPN network node. APPN network and end nodes are well-known and are, for example, described in detail in *Systems Network Architecture Advanced Peer to Peer Networking Architecture Reference* IBM Doc SC30-3422 and *APPN Networks* by Jesper Nilausen, printed by John Wiley and Sons, 1994, at pgs 1–83.

FIG. 3 is a schematic block diagram of the software architecture of an APPN node 300. As noted, application 302 executing on an APPN end node communicates with another APPN end node through a LU—LU session; LU 304 within each end node functions as both a logical port for the application to the network and as an end point of the communication session. The session generally passes through a path control module 312 and a data link control (DLC) module 316 of the node, the latter of which connects to various network transmission media. A control point (CP) module 308 coordinates performance of all APPN functions within the node 300 and, in the case of an APPN network node, is in session with a CP in adjacent APPN network nodes. Through these CP—CP sessions, all network nodes in an APPN environment coordinate operation of the network, and exchange, inter alia, configuration information. By interfacing with a configuration database 310, the CP coordinates management of the actual data communication links (DLC) in the network.

When functioning as an APPN router node, such as NN 206, an intermediate session routing (ISR) module 305 maintains a portion of the session in each "direction" with respect to an adjacent network node, such as NN 216 of network 200. In response to receiving the BIND message during session establishment, path control 312 and ISR 305 are invoked to allocate resources for the session. In particular, each entity 206, 216 allocates a local form session identifier for each direction of the session. Collectively, each of these individually-established "local" sessions form the logical communication session between the LUs 304 of the end node entities 202, 212.

The APPN router node may provide Dependent LU Requester (DLUR) services on behalf of the PU ("dependent" LU) in network 200 while the host network connection 202 may provide Dependent LU Server (DLUS) services. As described herein, the DLUS host is coupled to the DLUR router by way of a "pipe" connection over which control traffic for the dependent session flows. The DLUR router essentially functions as a "surrogate" for the downstream PU with respect to the DLUS host such that the control information flows over the network to the PU by way of the DLUR router.

Data Link Switching (DLSw) is a mechanism for forwarding SNA protocol frames over, e.g., a TCP/IP backbone WAN such as the Internet. In traditional bridging, the data link connection is end-to-end, i.e., effectively continuous between communicating end stations. A stream of data frames originating from a source station on a source LAN traverses one or more bridges specified in the path over the LLC2 (DLC) connection to a destination station on a destination LAN. In a network implementing DLSw, by contrast, the LLC2 connection terminates at a local DLSw device entity, e.g., a router. An example of a DLSw network arrangement may comprise a host DLSw router connected to a host computer via a host LAN and a remote DLSw router connected to a remote LAN having a destination station. The LANs that are accessed through the DLSw routers may appear as SRB subnetworks attached to adjacent rings; each of these adjacent rings manifest as a virtual ring within each DLSw router that effectively terminates the SRB network.

A DLSw network is formed when two DLSw devices interconnect the end nodes of the APPN network by way of the IP network; the DLSw devices preferably communicate using a Switch-to-Switch protocol (SSP) that provides packet "bridging" operations at the LLC (i.e., DLC) protocol layer. FIG. 4 is a schematic block diagram of a DLSw network 400 having a TCP/IP cloud 410 disposed between host and remote SRB subnetworks 420, 430. Each SRB subnetwork comprises a DLSw router 1, 2 coupled to the host network connection 402 and PU/LU 412 via TR1 and 2, respectively. The DLSw routers function as end points between TCP sessions over the TCP/IP cloud when transporting TR frames associated with DLC sessions over that intermediate network.

Broadly stated, each DLSw router establishes a "peer relationship" to the other DLSw router in accordance with a conventional capabilities exchange message sequence, and the logical and physical connections between these routers connect the subnetworks into a larger DLSw network. To establish a peer connection in accordance with an implementation of DLSw switching, the host DLSw router first opens logical TCP (Read/Write) "pipe" connections to the remote DLSw router using a conventional socket technique to create a socket into the transport layer of the protocol stack. Once the TCP pipes are established, the SSP protocol is used to transport the capabilities exchange messages between the two DLSw routers.

The capability exchange messages contain various parameters, such as the number of pipes used for communicating between the DLSw routers and the largest frame size supported by the routers. Each DLSw router responds to each capability exchange message issued by its peer router with a capability exchange response message. Upon completion of the exchange, each router reconfigures itself to "act upon" the agreed capabilities and the peer connection is established. Establishment of a peer connection can occur automatically upon "boot-up" of each DLSw router; that is, as soon as a DLSw router activates, it connects with its DLSw peer. The DLSw forwarding mechanism is well known and described in detail in *Request For Comment (RFC) 1795* by Wells & Bartky, 1995 at pgs 1–91.

Upon receiving a TR frame from a source on the host SRB subnetwork that is destined for a destination on the remote subnetwork, the host DLSw router employs the SSP protocol to communicate with its DLSw peer router by forwarding the native TR frame over the TCP/IP network to the remote SRB subnetwork. That is, the TR frame received at the host DLSw router from the source is encapsulated within a SSP protocol frame and forwarded over the TCP/IP cloud to the remote DLSw router. The source route information contained in the RIF of each TR frame terminates inside the virtual ring of the DLSw router; notably, the RIF information is locally stored at the DLSw router.

The host DLSw router then multiplexes the LLC2 session data stream over a conventional TCP transport connection to a remote DLSw router. LLC2 acknowledgment frames used to acknowledge ordered receipt of the LLC2 data frames are "stripped-out" of the data stream and acted upon by the host DLSw router; in this way, the actual data frames are permitted to traverse the IP cloud to their destination while the "overhead" acknowledgment frames required by the LLC2 connections for reliable data delivery are kept off the cloud. The LLC2 connections from the source LAN to the host transmitting DLSw router, and from the remote receiving DLSw router to the destination LAN, are entirely independent from one another. Data link switching may be further implemented on multi-protocol routers capable of handing DLSw devices as well as conventional (e.g., SRB) frames.

DLSw routers can establish multiple parallel TCP sessions using well-known port numbers. All frames associated with a particular LLC2 connection typically follow a single designated TCP session. Accordingly, SNA data frames originating at the PU are transmitted over a particular LLC2 connection along TR2 to DLSw2, where they are encapsulated within a designated TCP session and transported over the TCP/IP cloud 410. The encapsulated messages are received by DLSw1, decapsulated to their original frames and transmitted over a corresponding LLC2 connection of TR1 to the host in the order received by DLSw2 from the PU.

The LLC2 connection between the PU and host is identified by a data link identifier (ID) 460 consisting of a pair of attachment addresses associated with each end station. Each attachment address is represented by the concatenation of a media access control (MAC) address (6 bytes) and a LLC service access point (SAP) address (1 byte). Specifically, each attachment address is classified as either a target address comprising a destination MAC (DMAC) and a destination SAP (DSAP), or an origin address comprising a source MAC (SMAC) and source SAP (SSAP) addresses. The attachment addresses are contained in the TRs frame exchanged between the PU and host entities.

Furthermore, the designated TCP session is identified by a pair of circuit IDs 470, each comprising a 64-bit number that identifies the LLC2 circuit within a DLSw circuit. The DLSw circuit ID generally comprises a data link circuit port ID (4 bytes) and a data link correlator (4 bytes). A pair of circuit IDs along with a data link ID uniquely identifies a single end-to-end circuit through the network. Notably, each DLSw router maintains a table 450 comprising a plurality of data link ID and corresponding DLSw circuit ID pair entries. In order to associate LLC2 frame traffic with a corresponding DLSw circuit when communicating over the IP cloud, each DLSw router typically indexes into the table (the "DLSw table") using a data link ID to find the corresponding DLSw circuit IDs.

The DLSw circuit information described above, including the data link IDs, are available to a network operator of a network management station (NMS) 480 via a Simple Network Management Protocol (SNMP) configured to access DLSw management information base (MIB) tables within the routers. The MIB and SNMP protocol, and their use in providing network management information between SNMP management stations and agents are well-known and described in, e.g., *SNMP, SNMPv2* and *RMON* by William Stallings, printed by Addison Wesley Publishing Company, 1996.

The orientation of the MAC/SAP attachment addresses of the data link IDs acquired from each router is dependent on the proximity of the SNA entity to which the router is connected. For example, the remote DLSw router identifies the PU MAC/SAP attachment address as origin and the host network connection MAC/SAP attachment address as target, whereas the host DLSw router identifies the PU and host connection addresses in reverse order. The DLSw routers do not, however, maintain the name of the PU, which is a common way for an operator to identify a session.

A problem involving a PU session in the network 400 may be diagnosed by the network operator using a conventional approach that correlates SNA frame traffic sessions to DLSw routers for a network having a peer connection over an IP cloud between DLSw peer routers. Typically, management of the SNA entities takes place on the host in accordance with a network management application program, such as NetView, executing on the host. The application can access the status of the PU and LU entities by virtue of their definitions contained in a specialized data structure 490 of the host network connection 402. This data structure is a virtual telecommunication access method (VTAM) table 490 having entries whose contents define all the PUs and LUs with respect to the host. The content definitions of the entries comprise a name (e.g. PU name 492) along with a block number and ID number (IDBLK/IDNUM 494) that uniquely identifies each PU on a network at a given time.

The NetView application manages those SNA resources known to it; as used in this context, the term "managing" means that the application program can check and change the status of the resources, and can further control those resources to acquire, e.g., information leading to the traffic patterns of the resources. However, the NetView application cannot manage the component in the routers that encapsulate SNA traffic. As noted, the DLSw routers are preferably managed by the SNMP tool executing on the NMS which communicates with SNMP agents resident on the routers.

According to the conventional approach, the NMS communicates with an SNMP agent in each DLSw router to acquire DLSw MIB information including a data link ID identifying a DLSw circuit associated with the router. Since the host computer "owns" SNA sessions in the network, it maintains SNA-specific information (in addition to the PU name) such as the MAC/SAP addresses 496 for the host network connection and the PU on VTAM 490 in the host. The NMS issues commands to the host over a pipe connection 485 to retrieve the SNA-specific information from VTAM. The SNA-specific information retrieved from VTAM 490 does not, however, include information with respect to the DLSw routers that are routing the session traffic.

In response to a query from the operator specifying a PU name of the session, the NMS compares the MAC/SAP addresses retrieved from VTAM with the data link IDs in the MIBs to identify a DLSw circuit at each router. The NMS then uses the orientation of the MAC/SAP attachment addresses from the routers to distinguish between the host and remote DLSw routers. Thereafter, the NMS can draw the topology of the DLSw network, including the DLSw circuit and PU session path, to isolate any failures in the network.

However, if the session path traverses a heterogeneous network having both DLSw and APPN devices, correlation cannot be done efficiently using the conventional approach primarily because the host (VTAM) does not store the MAC/SAP address information of the PU in such a mixed APPN/DLSw network. That is, the host "sees" a 5 logical connection between its DLUS service and the DLUR service terminating at the APPN router; accordingly, the MAC/SAP address information stored in VTAM that is typically associated with the PU is actually the address of the APPN (DLUR) device. Data intended for the PU is sent from the host to the DLUR and it is the responsibility of the DLUR to forward that information to the PU. As a result, the SNA-specific information retrieved from VTAM includes the MAC/SAP address of the APPN DLUR device.

As noted, the DLSw circuit information acquired by the NMS via the SNMP queries includes the MAC/SAP address information of the host and the PU. Yet this DLSw circuit information cannot be directly correlated with the VTAM supplied information because the "PU" information differs (the actual PU MAC/SAP information versus the DLUR MAC/SAP information). Moreover, the APPN DLUR device maintains information (such as the PU name) of the PU but it does not recognize the presence of DLSw devices routing session traffic between it and the PU. Therefore, the conventional correlation approach cannot be effectively used to correlate information between SNA/IP segments of a mixed APPN and DLSw network.

The present invention is directed to providing the appropriate tools to draw an SNA session over such a network topology. In particular, the invention provides a method to correlate SNA traffic sessions that traverse both DLSw and APPN devices to enable a complete view of a mixed APPN and DLSw network. More specifically, the present invention is directed to a technique for correlating SNA/IP information within a heterogeneous network having APPN and DLSw routers to enable drawing of a SNA session and diagnosing of problems associated with the session.

SUMMARY OF THE INVENTION

The present invention comprises a technique for efficiently correlating information pertaining to entities of a mixed Advanced Peer to Peer Networking (APPN) and Data Link Switching (DLSw) computer network. The entities comprise System Network Architecture (SNA) host mainframe ("host") and physical unit (PU) entities, along with DLSw and APPN/DLSw devices. Broadly stated, the technique involves identifying a SNA session path as using Dependent Logical Unit Requester (DLUR) services of the APPN/DLSw device and thereafter obtaining media access control (MAC)/service access point (SAP) information needed to correlate the SNA session to the DLSw peer devices and an associated DLSw peer circuit connection. A DLSw peer connection is established between the APPN/DLSw device and its remote "peer" DLSw device that comprises DLSw circuits identified by, inter alia, data link identifiers (IDs) comprising attachment addresses of the DLUR and PU entities.

According to the invention, the technique involves determining whether the network includes an APPN device by identifying the PU as "going through" a DLUR. A virtual telecommunication access method (VTAM) display of an active PU at a network management station (NMS) indicates whether the device is, e.g., an APPN router performing DLUR services on behalf of the PU. If the network includes such an APPN node, the DLUR name retrieved from VTAM is of the form NETID.CP name. Note that the NMS communicates with the host over a "pipe" connection to acquire SNA-specific information from a VTAM table structure at the host. The SNA-specific information acquired from VTAM includes, inter alia, (i) the MAC/SAP addresses of the APPN DLUR device; (ii) the DLUR name for the PU, (iii) a control point (CP) name of the PU; and (iv) an ID block number/ID number (IDBLK/IDNUM) of the PU.

Next, the technique determines whether the DLUR device is a manageable router and, if so, correlates the APPN/DLUR name of the router to an Internet Protocol (IP) address. A node is considered manageable if it responds to simple network managment protocol (SNMP) queries from the NMS with requested information using, e.g., an APPN management information base (MIB) query to determine its CP name. Here, the NMS has access to a list of IP addresses of the routers. If the router does not have APPN functionality, it responds negatively to the MIB query; otherwise, the router responds with its NETID.CP name in the APPN MIB. A simple correlation is then performed between the APPN addressing (NETID.CP name) and SNMP addressing (IP address) for that router.

A next step of the inventive technique is to find a logical connection (i.e., a "link station") between the APPN router and the PU. In accordance with one aspect of the invention, a DLUR MIB may be used to query the DLSw/APPN router. The DLUR MIB includes a field (dlurPuLsName) that identifies the link station for a particular PU that is used to communicate with the DLUR router. If the router does not support the DLUR MIB, the CP name of the PU provided by VTAM may be used as the basis of a query into the APPN MIB (appnLsTable) for a matching CP name (appnLsAdjCpName) associated with the logical link station. If the CP name is not provided, the IDBLK/IDNUM of the PU provided by VTAM may be used to query the appnLsTable to find a matching appnLsPartnerNodeId entry associated with the link station. If the MIBs cannot be used, native device commands (such as router show commands) can be employed to collect this information.

The inventive technique then proceeds to obtain the MAC/SAP address of the APPN link station associated with the PU, which is the remote MAC/SAP address for the DLSw circuit. Preferably, this information is obtained from an APPN MIB. The MAC/SAP address of the APPN router is also obtained from the APPN MIB; this address information is the local MAC/SAP address for the DLSw circuit. The order of the DLSw peer routers is then determined. In the illustrative embodiment, the APPN/DLSw router is the router coupled to the host-side of the network since it identifies the MAC/SAP addresses of its DLUR function as its origin attachment address and the MAC/SAP addresses of the PU as its target attachment address. Furthermore, DLSw router is the router coupled to the remote-side of the network since it identifies the MAC/SAP addresses of the PU as its origin attachment address and the MAC/SAP addresses of the APPN/DLUR as its target attachment address.

Once the order of the DLSw peer routers is determined, the topology of the mixed APPN/DLSw network may be drawn illustrating the relationship between the routers and the SNA entities of the network. Graphical representations of network on the display may include identifying the host-based, APPN/DLSw (DLUR) device with a different icon than the DLSw device. The invention thus allows the NMS to correlate an SNA session over a complex network with a network path that includes DLSw and APPN devices. More specifically, the present invention provides management tools that enable viewing of all segments of the network traversed by the SNA session to thereby enable isolation of a network problem to one of the network segments for a more specialized and targeted diagnosis.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 5:
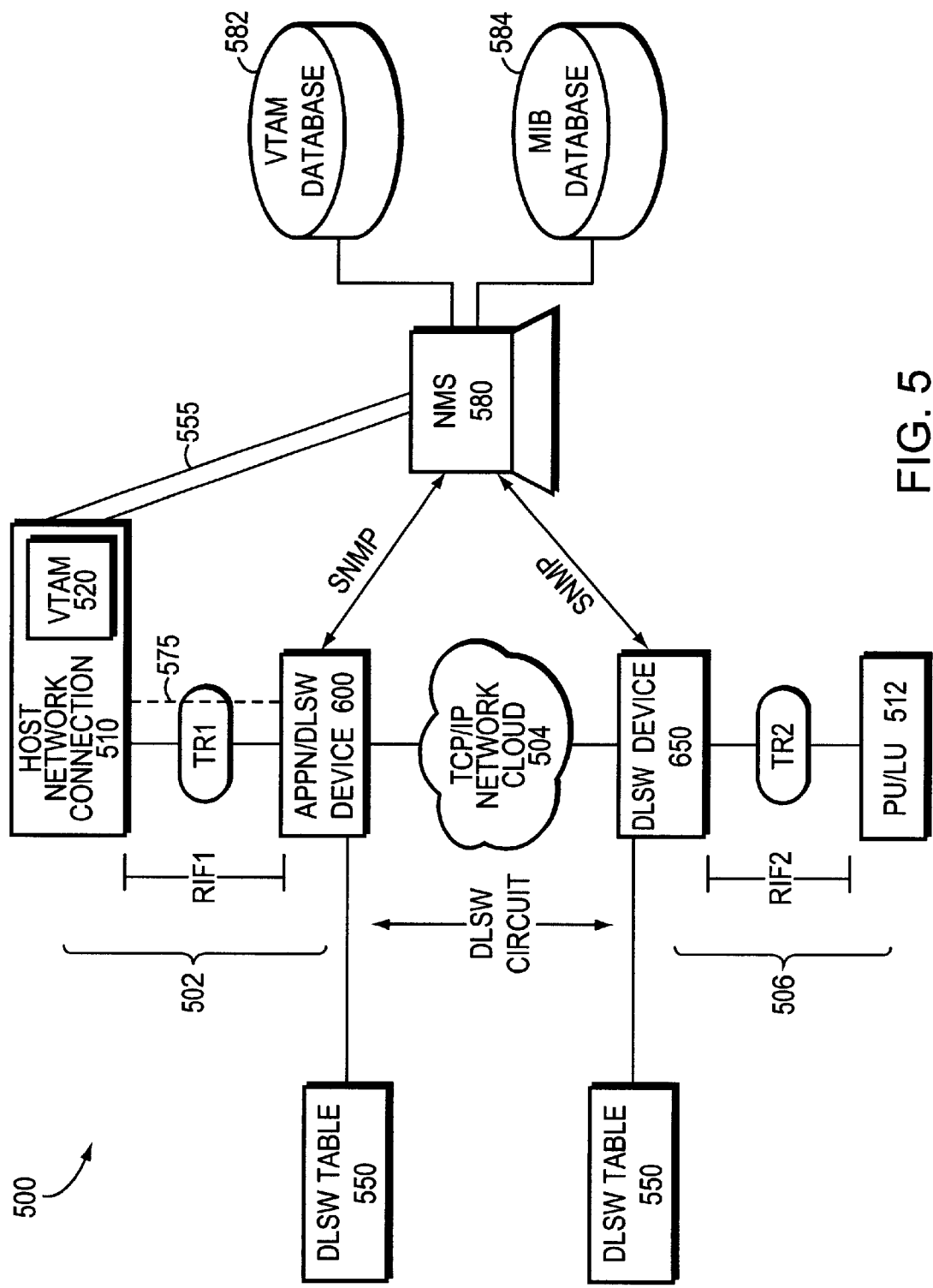
FIG. 5 is a block diagram of an illustrative embodiment of a heterogeneous computer network, including a DLSw device node and an APPN/DLSw hybrid device node for interconnecting various subnetworks and communication links on which the present invention may advantageously operate.

FIG. 5 is a highly schematic block diagram of a heterogeneous computer network 500 comprising a plurality of subnetworks 502, 506 interconnected by a wide area network (WAN) 504. Each subnetwork 502, 506 is preferably of a type that supports source-route bridging (SRB) operations with respect to the contents of a routing information field (RIF) of a frame. The subnetworks are attached to a plurality of stations preferably embodied as internetworking computer platforms and comprising a host computer 510, an end station 512, a network management station (NMS) 580 and a plurality of intermediate stations 600, 650. In particular, the host computer 510 is coupled to a token ring (TR) local area network (LAN) TR1 to form subnetwork 502 and the end station 512 is coupled to TR2 to form subnetwork 506.

The host computer is preferably a Systems Network Architecture (SNA) host entity comprising a mainframe computer coupled to a channel-attached router or front end processor (FEP), hereinafter referred to as the host network connection or "host" 510. The end station is preferably a SNA Physical Unit (PU) entity functioning in accordance with Advanced Peer to Peer Networking (APPN) Dependent Logical Unit Requestor (DLUR) services. In addition, the intermediate station 650 is a data link switching (DLSw) device or "router", whereas intermediate station 600 may comprise two independent devices, such as an APPN device and a DLSw device (router). In the illustrative embodiment described herein, however, the intermediate station 600 is an APPN/DLSw router. The APPN/DLSw router 600 preferably incorporates a DLUR function and the host 510 incorporates a Dependent LU Server (DLUS) function; these functions communicate via an APPN session over a logical link 575 of TR1. As a result, the network 500 comprises an APPN portion (between the host and APPN function of router 600) and a DLSw portion (between the DLSw function of router 600 and router 650).

Each station typically comprises a plurality of interconnected elements, such as a processor, a memory and an input/output (I/O) unit. The memory may comprise storage locations addressable by the processor and I/O unit for storing software programs and data structures associated with the inventive mixed network correlation technique. The processor may comprise processing elements or logic for executing the software programs and manipulating the data structures. An operating system, portions of which are typically resident in memory and executed by the processor, functionally organizes the station by, inter alia, invoking network operations in support of software processes executing on the station. It will be apparent to those skilled in the art that other processor and memory means, including various computer readable media, may be used for storing and executing program instructions pertaining to the technique described herein.

The I/O unit, in turn, connects the station to mass storage devices, such as disks, and to the subnetworks. The NMS may further include a conventional display monitor with a display screen and cursor control devices, such as a keyboard, connected to I/O unit. A window environment, such as a graphical user interface (GUI), is preferably displayed on the screen as a graphical display to facilitate interactions between a network operator and the station. For the NMS and intermediate stations, the disk may function as a database for storing network information, as described further herein. Typically, the I/O unit receives information, such as control, address and data signals, from the keyboard or the database, and provides that information to the processor for display on the screen or for transfer over the subnetworks.

The routers 600, 650 interconnect the subnetworks 502, 506 and facilitate communication among the host and PU over the WAN, which is preferably a Transmission Control Protocol/Internet protocol (TCP/IP) network cloud 504. Communication among the stations is effected by exchanging discrete packets or frames of data according to predefined protocols and services; an example of a connection-oriented service that may be used to ensure reliable communication between the PU station and the host station is an IEEE 802.2 Logical Link Control Type 2 (LLC2) or Data Link Control (DLC) connection service.

Figure 1:
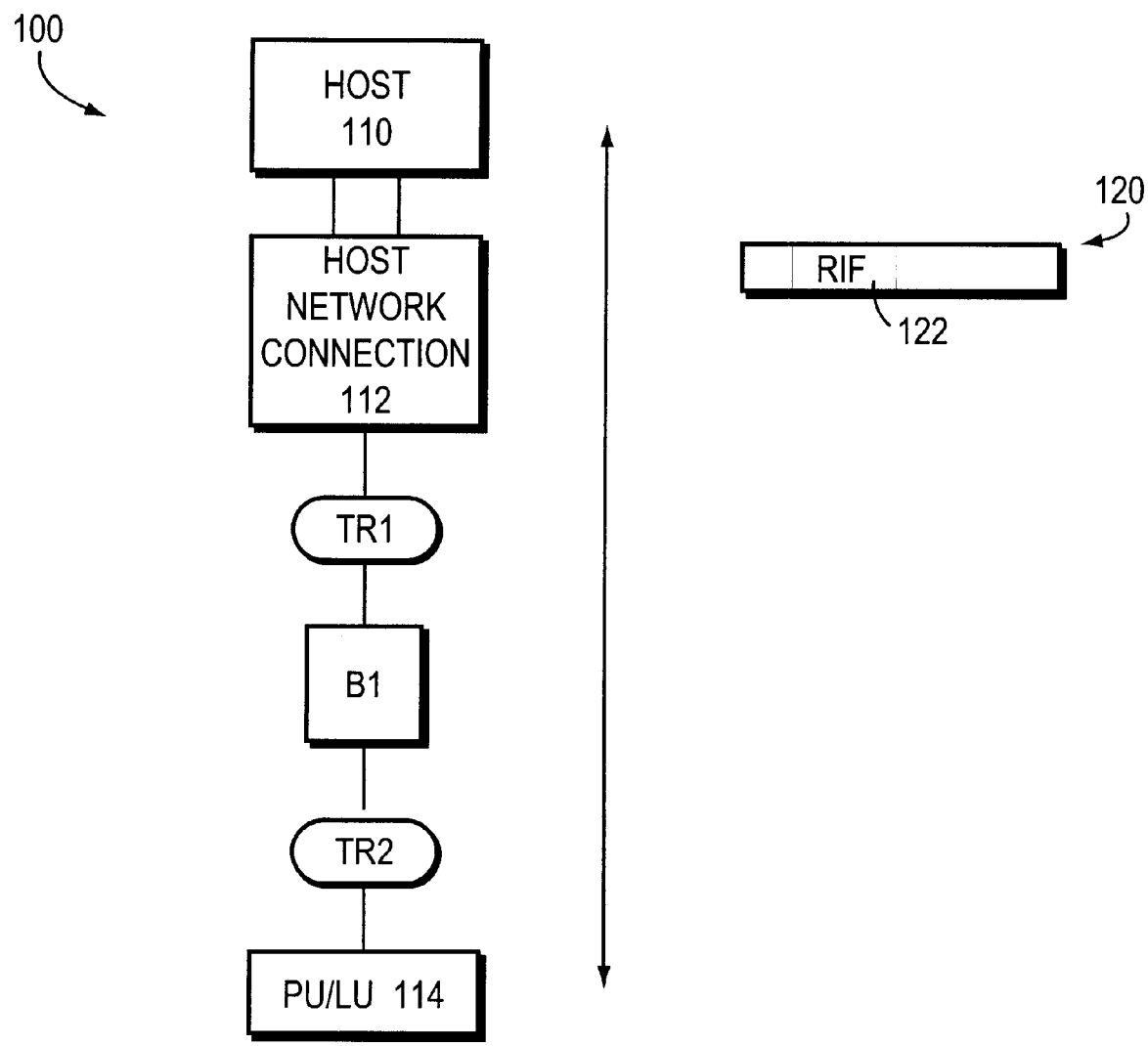
FIG. 1 is a schematic block diagram of a conventional computer network having a host computer and end station coupled to a plurality of token ring local area networks to form a source-route bridge (SRB) network.
Figure 2:
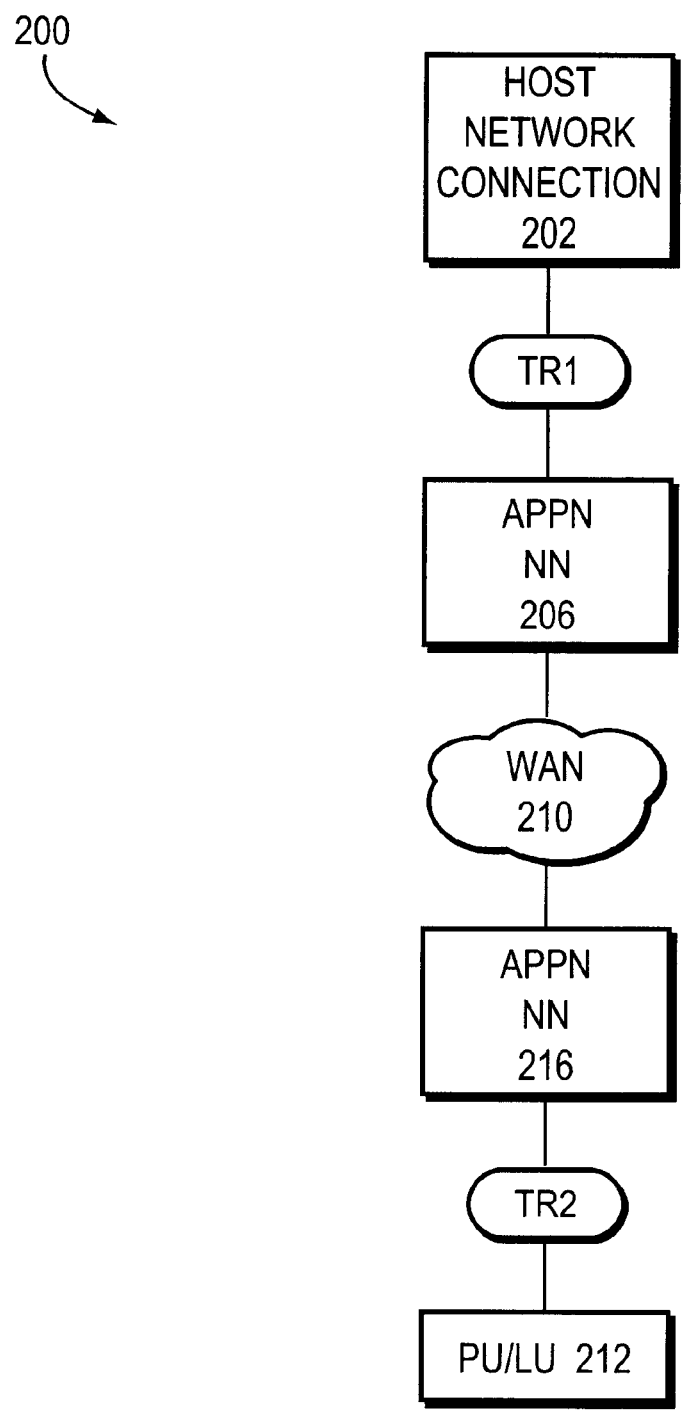
FIG. 2 is a schematic block diagram of a prior art Advanced Peer to Peer Networking (APPN) network including APPN nodes.
Figure 3:
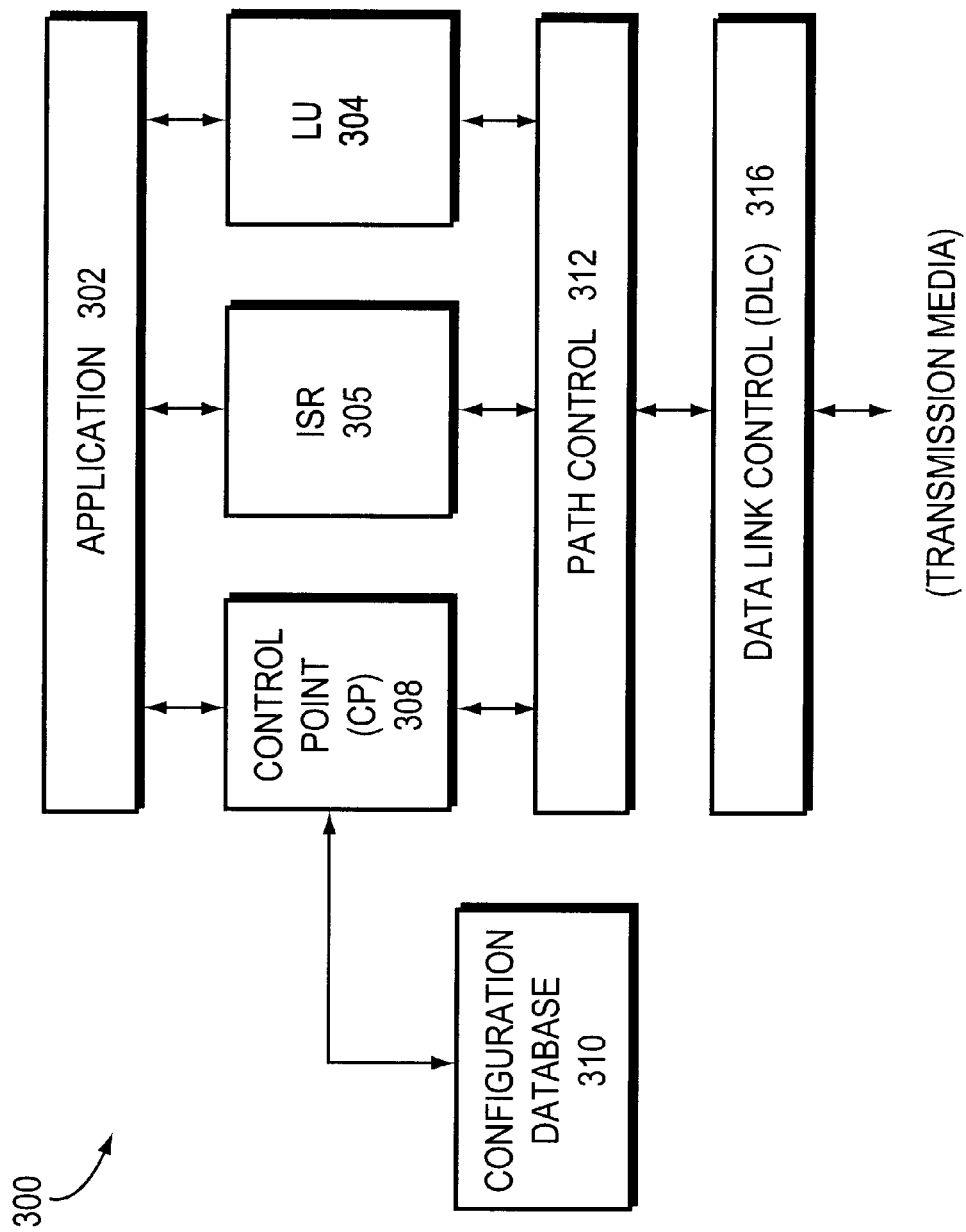
FIG. 3 is a schematic block diagram of the software architecture of an APPN node.
Figure 4:
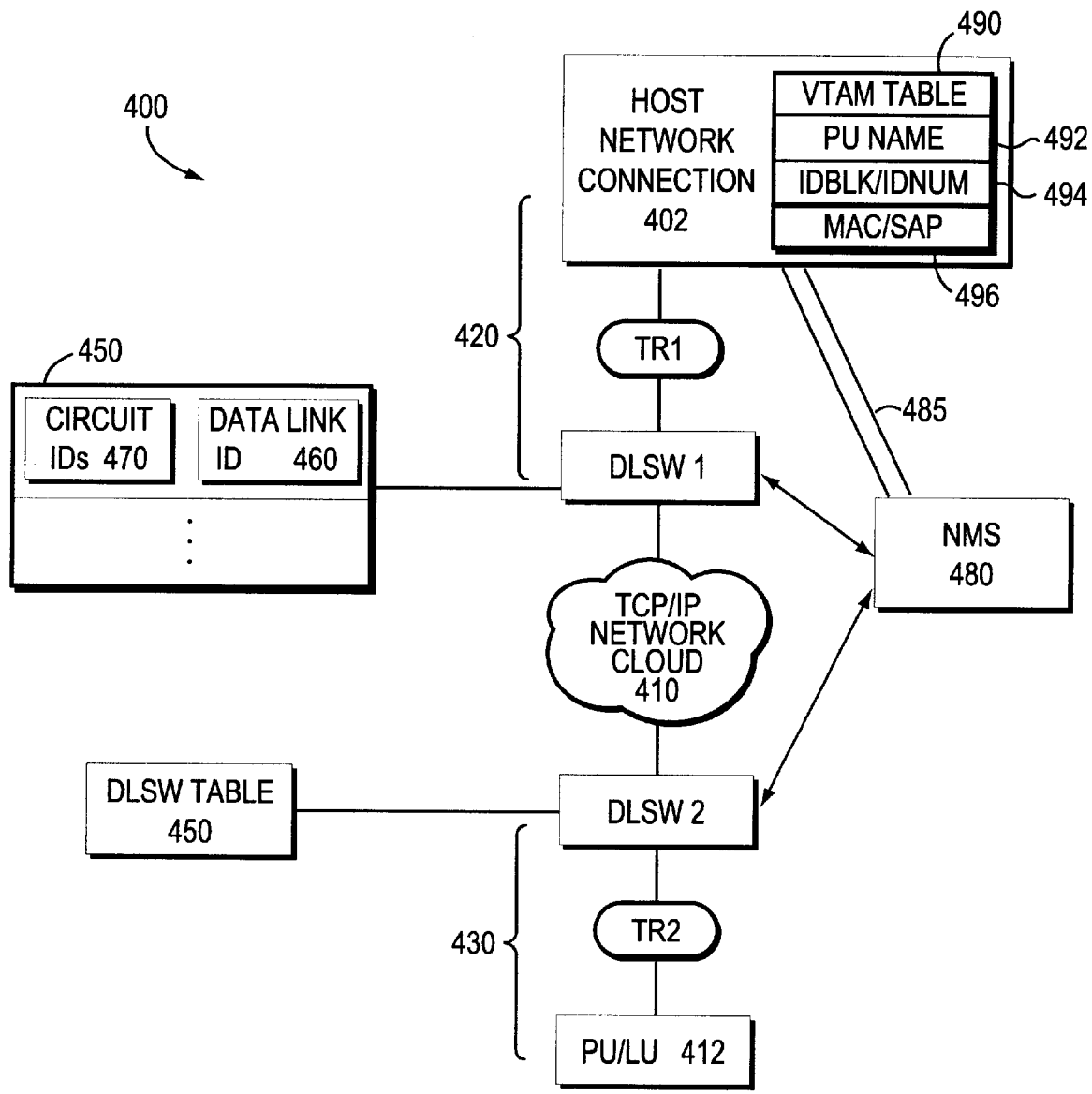
FIG. 4 is a schematic block diagram of a data link switching (DLSw) network.
Figure 6:
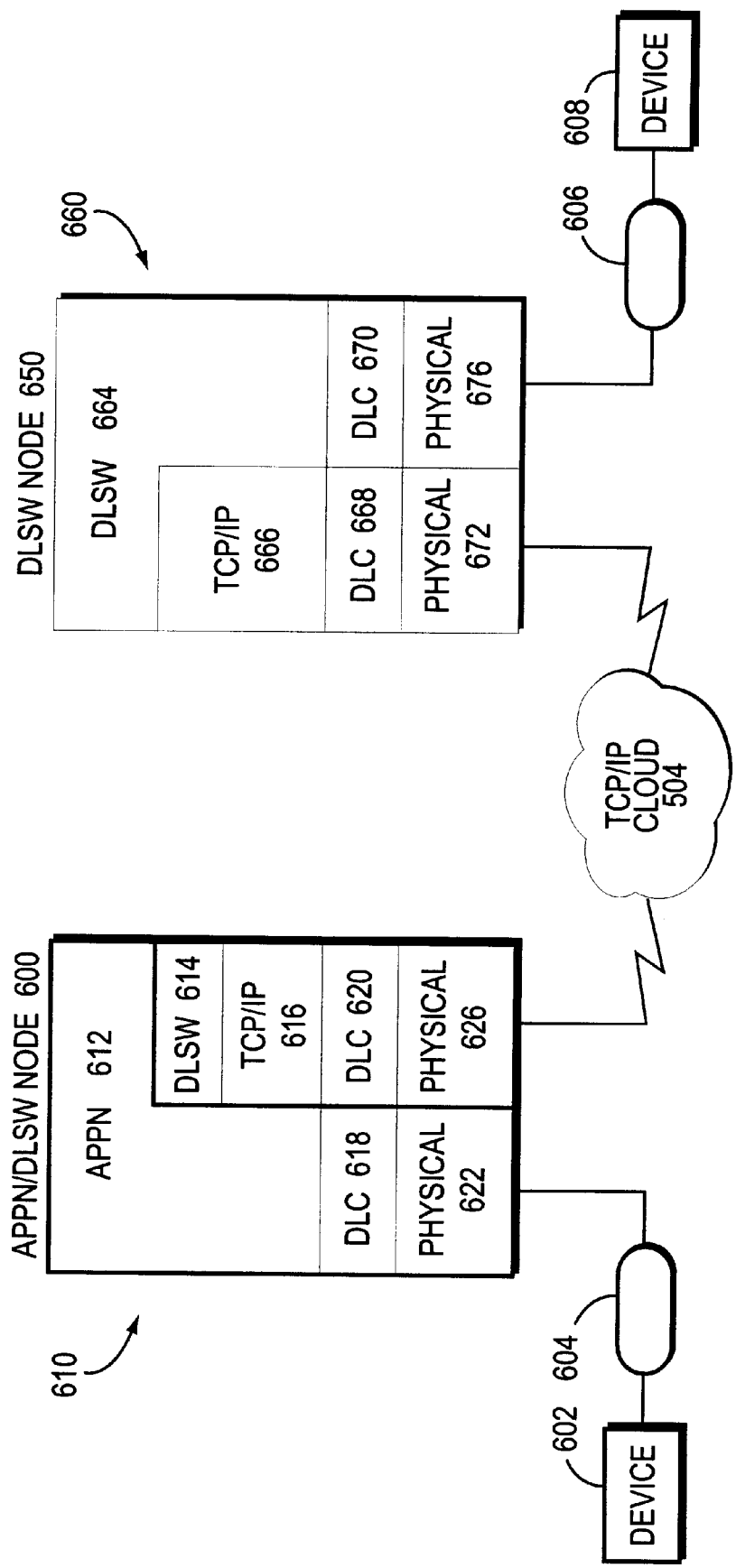
FIG. 6 is a schematic block diagram of protocol stacks contained within DLSw and APPN/DLSw nodes of a heterogeneous computer network similar to the network of FIG. 5.

Heterogeneous network 500 is formed when APPN/DLSw hybrid node 600 is connected to DLSw node 650 via the TCP/IP network 504. FIG. 6 is a schematic block diagram of protocol stacks 610, 660 within the nodes 600 and 650, respectively. Applications executing on SNA devices (stations) 602, 608 typically access the network through logical units (LUs) of the stations and communicate via LU—LU sessions. Hybrid node 600 functions to facilitate establishment and routing of these connection-oriented communication sessions within the network. To this end, protocol stack 610 preferably comprises an APPN layer 612 that contains the software modules described in FIG. 3.

The stack 610 also includes a TCP/IP layer 616 containing those layers of the Internet communications architecture protocol stack needed to establish, e.g., conventional connection-oriented, TCP communication sessions. Physical sublayers 622 and 626 specify the electrical, mechanical, procedural and functional specifications for activating, maintaining and de-activating the physical links 604 and 504 of the network. Protocol stack 660 of DLSw node 650 likewise includes a TCP/IP layer 666 and physical sublayers 672 and 676, which are functionally equivalent to those layers of protocol stack 610.

Each node 600, 650 further contains a DLSw layer 614, 664 and DLC layers 618, 620 and 668, 670, respectively, the latter layers providing a connection-oriented service via conventional DLC (LLC2) connections. The DLSw layers provide a mechanism for forwarding data frame traffic between devices 602, 608 over IP network 504. Note that there is a virtual DLC mechanism, similar to a port, that is used to communicate between the DLSw and APPN layers of router 600. Preferably, the DLSw layers 614, 664 cooperate to establish a peer relationship among themselves through the exchange of conventional capabilities exchange messages. These peer devices further cooperate to establish a conventional reliable transport connection, such as a TCP connection, that enables multiplexing of DLC (LLC2) data frames over the TCP transport between the devices.

As a result, the routers 600, 650 function as peers having logical and physical connections among them for interconnecting the subnetworks 502, 506 through the IP cloud 504 to form the mixed APPN/DLSw heterogeneous network 500. Each logical connection is manifested as a DLSw circuit having a data link identifier (ID) comprising media access control (MAC) and service access point (SAP) attachment addresses of the host and PU entities. For example, a DLSw circuit extends between APPN/DLSw router 600 and DLSw router 650 wherein, APPN/DLSw router 600 is configured as a host router coupled to TR1 and having a peer relationship with remote router DLSw 650 over IP cloud 504. The generation of DLSw circuits and identifiers is described in *Request for Comment (RFC) 1795* by Wells & Bartky, 1995, while the establishment of TCP sessions is described in *Internetworking with TCP/IP* by Comer and Stevens, printed by Prentice Hall, 1991; all of these publications are hereby incorporated by reference as though fully set forth herein.

The RIF contains source route information in the form of ring number/bridge number tuples within a path between the stations. There is a RIF1 associated with subnetwork 502, and a RIF2 associated with subnetwork 506. The RIF information terminates inside a virtual ring of each router and is locally stored at the router, preferably on a DLSw table 550. Thus, RIF1 is "cached" at APPN/DLSw router 600 and RIF2 is cached at DLSw router 650. In addition, each DLSw table 550 contains data link and circuit IDs of the DLSw circuit associated with the respective DLSw layer in the router.

The DLSw portion of the network environment is managed by the NMS which, in the illustrative embodiment, is preferably a UNIX workstation configured to execute a network management application. An example of such an application is the CiscoWorks Blue Maps and CiscoWorks Blue SNA View product set, available from Cisco Systems, Inc. The CiscoWorks Blue product set provides a network operator with tools to draw a path of data transferred through the DLSw network. That is, the product set provides a view of an SNA data session extending from the PU through a DLSw peer connection to the host network connection. Using the product set, the operator may diagnosis and fix problems by understanding the data path through the network, and isolating the problem to one of the segments in the network. The present invention is an extension to the conventional approach for correlating SNA/IP information in a heterogeneous network having a mixed DLSw and APPN router configuration utilizing this product set.

The CiscoWorks Blue SNA View tool has a mainframe component and a UNIX workstation component that allows the NMS to retrieve SNA-specific information about the host and PU entities. The NMS 580 communicates with the host station over a TCP/IP (or LU 6.2) "pipe" connection 555 to acquire the SNA-specific information available from a virtual telecommunication access method (VTAM) table 520 at the host. The SNA-specific information acquired from VTAM includes (i) MAC/SAP addresses of the DLUS host and the DLUR router; (ii) the DLUR name for the PU, (iii) a control point (CP) name of the PU; (iv) an ID block number/ID number (IDBLK/IDNUM) of the PU and (v) the RIFI associated with subnetwork 502. This information is stored in a VTAM database 582 of the NMS.

The NMS 580 also communicates with the routers using a simple network management protocol (SNMP) to acquire IP-specific information. Here, the CiscoWorks Blue SNA View tool queries SNMP agents in the DLSw layers of the routers to acquire the information used to determine the peer relationships among the DLSw layers. The IP-specific information provided by each router includes (i) origin and target attachment (MAC/SAP) addresses of a DLSw circuit associated with the router, (ii) a circuit state of its DLSw circuit, (iii) its associated RIF, and (iv) an IP address of its peer DLSw layer router.

The NMS acquires the IP-specific information from the routers via DLSw management information base (MIB) structures for storage on a MIB database 584 of the NMS 580. An example of a DLSW MIB that may be advantageously used with the present invention is disclosed in Request for Comment (RFC) 2024, which is hereby incorporated by reference in its entirety. It should be noted that network management techniques other than SNMP, such as "sniffers" or show commands in the routers, may be used to acquire the circuit information from the routers.

The CiscoWorks Blue Maps tool further includes an APPN component whereby the NMS can communicate with the APPN layer 612 of router 600 using SNMP to acquire APPN-specific information via a DLUR and APPN MIB. Examples of MIBs that may be advantageously used with the present invention include (i) an IBM-6611-APPN-MIB described in RFC 1593, (ii) an APPN MIB described in RFC 2455, and (iii) a DLUR MIB described in RFC 2232, each of which is hereby incorporated by reference in its entirety. Note that the latter DLUR MIB is associated with the DLUR function within an APPN device, such as the DLSw/APPN router 600. Since VTAM is not configured to operate in accordance with SNMP, it does not implement the APPN MIB and thus cannot acquire the APPN-specific information described below.

Figure 7:
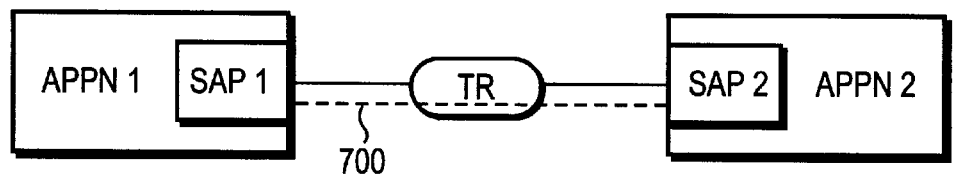
FIG. 7 is a schematic block diagram showing a logical link station connection between two APPN nodes.

Broadly stated, the DLUR MIB provides APPN-specific information relating to PU 512 and logical link 575 in the network 500, whereas the APPN MIB contains APPN-specific information pertaining to logical connections ("link stations") defined between, e.g., MAC/SAP addresses of APPN devices. FIG. 7 is a schematic block diagram showing the logical link station connection 700 between APPN nodes 1 and 2. The type of information acquired by the APPN MIB relates to the MAC/SAP addresses of the link. For example, APPN1 is assigned a MAC/SAP address wherein a SAP1 address is dedicated to an APPN (TR interface) port used to establish the logical link station 700 with another SAP2 address dedicated to an APPN port on APPN2. Referring to FIG. 5, assume APPN1 is the host 510 and APPN2 is the DLSw/APPN router 600; in this case, the MAC/SAP address of host 510 may be considered a local MAC/SAP address that establishes a link station connection 575 with a remote MAC/SAP port on DLSw/APPN router 600.

In accordance with the present invention, a technique is provided for correlating SNA sessions that traverse DLSW and APPN routers in the mixed APPN and DLSw heterogeneous network 500. The conventional correlation approach involves comparing the MAC/SAP addresses retrieved from VTAM at the NMS with the contents of the MIB database in order to retrieve a DLSw circuit ID (having matching MAC/SAP attachment addresses) which may then be used to identify the DLSw routers having a peer connection over the IP cloud. However, this conventional approach cannot be efficiently employed in a heterogeneous network having mixed APPN and DLSw routers. The present invention provides a technique for efficiently correlating SNA/IP information in such a heterogeneous network.

The novel technique generally involves identifying a session path as using DLUR services of an APPN router and thereafter obtaining the MAC/SAP information needed to correlate the SNA session to the DLSw peer routers. Determination of whether a router implements APPN DLUR services may be made by examining (at the NMS) the SNA-specific information retrieved from VTAM 520. For example if a router does not offer APPN services, the DLUR name for the PU is null. Since router 600 incorporates both DLSw and APPN services, there is a DLUR name associated with the PU 512 which, in the illustrative embodiment, is DLSwAPPN. The DLUR name is a network qualified name having a format of NETID.xxxxxxxx, wherein the latter is an 8-character string containing a control point (CP) name.

Figure 8:
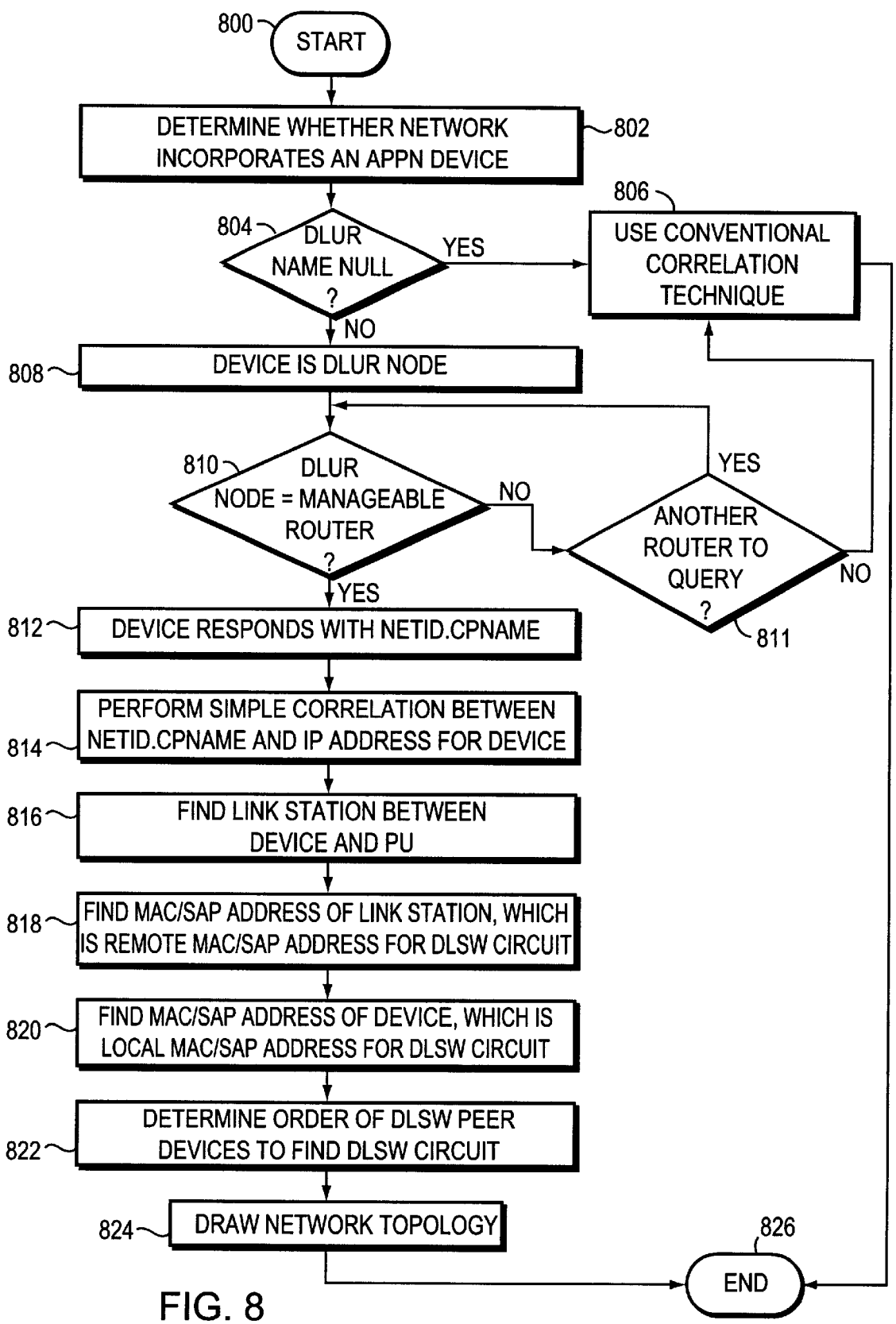
FIG. 8 is a flowchart illustrating the steps involved in a novel correlation technique for a mixed APPN and DLSw network in accordance with the present invention.

FIG. 8 is a flowchart illustrating the steps involved in a novel correlation technique (process) for a mixed APPN and DLSw network. The process begins at Step 800 and proceeds to Step 802 where the NMS determines whether the network incorporates an APPN router; this determination may be resolved by identifying the PU as "going through" a DLUR. A VTAM display at the NMS of an active PU indicates whether an APPN router performs DLUR services on behalf of the PU. Thus, a determination of whether the network incorporates an APPN node depends on whether the DLUR name retrieved from VTAM is null (Step 804). If so, the conventional correlation technique may be used to draw the topology of the resulting DLSw network. (Step 806). If the DLUR name is not null, there is a device that is a DLUR node having a name in the form NETID.CP name (Step 808). In the illustrative embodiment, the CP name is preferably DLSwAPPN.

Step 810 of the novel technique determines whether the DLUR node is a manageable router and, if so, correlates the APPN/DLUR name of the router to an IP address. A node is considered manageable if it responds to SNMP queries with the requested information. SNMP does not access nodes by NETID.CP name addressing, but rather uses IP addresses (or alternatively device names with domain name services to resolve IP addresses) of the nodes. Here, the NMS queries each router using the APPN MIB to determine its CP name. If the router does not have APPN functionality, it responds negatively to the MIB query and the process proceeds to query a next router in Step 811. If all of the routers respond negatively to the query, the conventional correlation technique may be used to draw only a subset of the network (Step 806); otherwise, the router responds with its NETID.CP name in the APPN MIB in Step 812. In the illustrative embodiment, the NMS queries each router by utilizing an existing database that includes a list of IP addresses of the routers. If a router responds with a DLUR name, then a simple correlation is performed between the APPN addressing (NETID.CP name) and SNMP addressing (IP address from OpenView) for that router in Step 814.

The next step of the inventive technique involves finding the APPN link station to the PU. Depending upon the router support and the type of PU, there are a number of ways to find the APPN link station. Step 816 involves utilizing the DLUR MIB to query the DLSw/APPN router (if the router implements the MIB) to fmd the link station. The DLUR MIB includes a table (dlurPuTable) having a plurality of entries (dlurPuEntries). Each entry is accessed by a PU name (obtained from VTAM) and contains a field whose contents (dlurPuLsName) identify the APPN link station for a particular PU that is used to communicate with the DLUR router. In order to access the correct entry of the DLUR MIB database table, the DLUR name of the PU retrieved from VTAM is used to find a matching dlurPuSscpSupplied-Name.

The router may have many link stations to many PUs; this step involves identifying a particular link station to a particular PU MAC/SAP address. The link station is a logical APPN link that extends from the DLUR router over the IP network to the PU. This step is useful if the router implements the DLUR MIB and can provide the link station name in response to the SNMP DLUR MIB query. If the router does not support the DLUR MIB or if it did not provide a value for the dlurPuLsName field, then there are two alternative approaches to finding the link station to the PU. In order for the PU to communicate with VTAM and the host, the PU must be identified to VTAM as either a CP name or IDBLK/IDNUM. When an APPN router connects with a PU to establish a logical link, there is an XID exchange which includes an exchange of the CP name or IDBLK/IDNUM of the PU; the APPN router maintains the CP name or IDBLK/IDNUM of the PU associated with the link station connection. Therefore, all logical link station connections between the APPN router and the PU can be searched to find a matching CP name or IDBLK/IDNUM.

The CP name provided by VTAM may be used as the basis of a query into the APPN MIB (appnLsTable) for a matching CP name (appnLsAdjCpName) associated with the logical link station. Note that, in an alternate embodiment, the query may constitute a look-up operation into an NMS database having the appnLsTable. If the CP name is not provided and the router does not support the DLUR MIB, the dlurPuName may be used to find a matching appnLsAdjCpName in the appnLsTable. In addition, the IDBLK/IDNUM provided by VTAM may be used as the basis of the APPN MIB appnLsTable query (or a look-up operation into the NMS database) to find a matching appnLsPartnerNodeld entry. If SNMP is not utilized, an alternate embodiment involves the use of show commands issued to the router to provide this type of information.

Step 818 of the inventive technique involves finding the MAC/SAP address of the APPN link station associated with the PU, which is the remote MAC/SAP address for the DLSw circuit. There is a field (appnLsRemoteAddr) in the APPN MIB that contains the MAC/SAP information for the link; the NMS maintains a table of all link stations organized according to their MAC/SAP addresses. Step 820 of the inventive technique involves finding the MAC/SAP address of the APPN router, which is the local MAC/SAP address of the port coupled to the logical link station. This information is also provided by the APPN MIB (appnLsLocalAddr) and represents the local MAC/SAP address for the DLSw circuit.

As noted, the DLSw layers 614, 664 of the host and remote routers 600, 650 cooperate to form a DLSw circuit having origin and target MAC/SAP attachment addresses. The orientation of these attachment addresses of the data link IDs acquired from each router is dependent on the proximity of the SNA entity to which the router is connected. Notably, the SNA entity on the APPN portion of the network 500 is the DLUR function of the router 600 rather than the host 510. Therefore, the remote router identifies the MAC/SAP addresses of the PU as its origin attachment address and the MAC/SAP addresses of the DLUR (instead of the host network connection) as its target attachment address; the host router identifies the PU and DLUR addresses in reverse order.

More specifically, the MAC/SAP address of the DLUR router 600 is the port number to the virtual DLC connection of the DLSw circuit. The DLSw layer 614 "routes" the DLSw circuit data to the appropriate DLUR port on the APPN layer 612 of the router. For the particular link station utilized, Step 820 of the technique may also search for the MAC/SAP address in the DLSw/APPN router 600, which is effectively the virtual MAC/SAP address of the DLUR function of that router.

Once the MAC/SAP addresses of the PU and the DLSw/ APPN router 600 are obtained, Step 822 comprises finding the DLSw circuit by determining the order of the DLSw peer routers. Referring to FIG. 5, APPN/DLSw router 600 is the host router that identifies the MAC/SAP addresses of the APPN/DLUR as its origin attachment address and the MAC/ SAP addresses of the PU as its target attachment address, while DLSw router 650 is the remote router that identifies the MAC/SAP addresses of the PU as its origin attachment address and the MAC/SAP addresses of the APPN/DLUR as its target attachment address.

Once the order of the DLSw peer routers is determined, the topology of the mixed APPN/DLSw network may be drawn in Step 824, illustrating the relationship between the routers and the SNA entities of the network. Graphical representations of network on the display may include identifying the host-based, APPN/DLSw (DLUR) router 600 with a different icon than the DLSw router 650. The inventive process then ends in Step 826.

Advantageously, the invention provides the ability for network management program to correlate an SNA session over a complex network with a network path including both DLSw and APPN routers. As the complexity of the session path increases, so does the need for management tools to be able to view all the segments of the network that the session traverses, in order to isolate a network problem to one of the network segments for a more specialized and targeted diagnosis.

Figure 9:
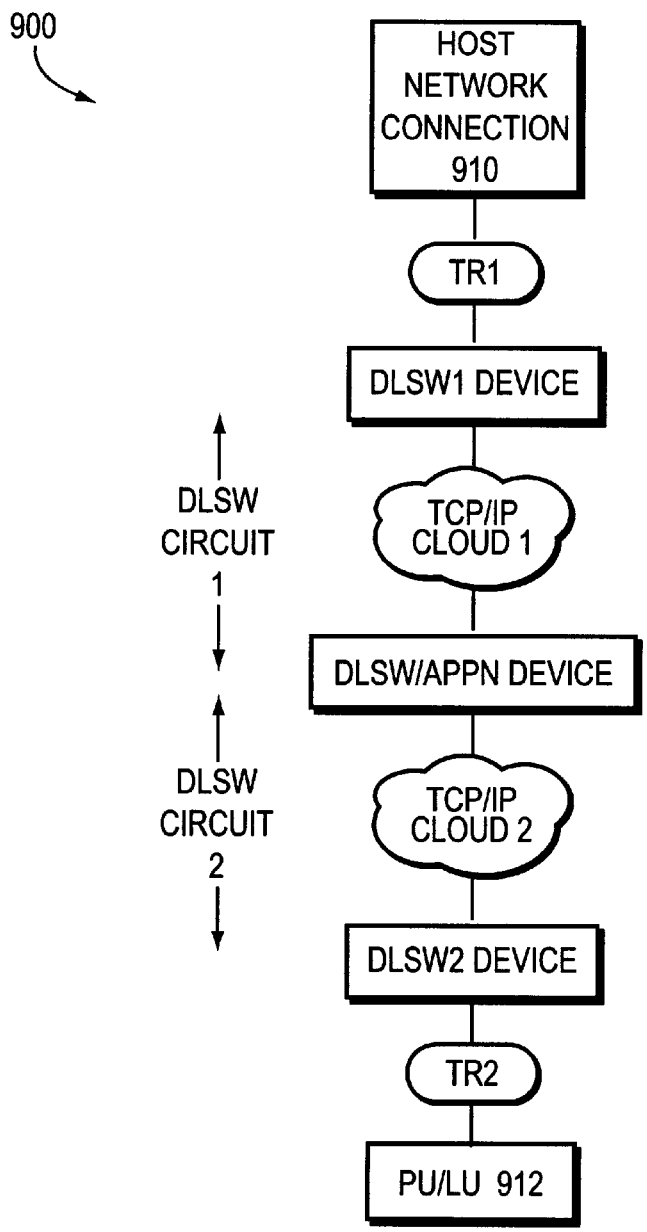
FIG. 9 is a schematic block diagram of an alternate embodiment of a mixed APPN and DLSw network having a hybrid DLSw/APPN device node disposed between a host-side DLSw device and a remote-side DLSw device that may be advantageously used with the present invention.

FIG. 9 is a schematic block diagram of an alternate embodiment of a mixed APPN and DLSw network 900 having a hybrid DLSw/APPN device node disposed between a host-side DLSwl device and a remote-side DLSw2 device. In this configuration, the devices are preferably routers wherein the host-side DLSw router is "peered" with the DLSw layer of the hybrid router, which is similarly peered with the remote-side DLSw router. The APPN/DLSw router thus has two DLSw circuits 1–2, wherein each of which it identifies the MAC/SAP addresses of its DLUR function as its origin attachment address. For the host-side circuit, the router identifies the MAC/SAP addresses of the host network connection 910 as its target attachment address, whereas for remote-side circuit, the APPN/DLSw router identifies the MAC/SAP addresses of the PU/LU 912 as its target attachment address. Correlation for the remote-side circuit may be achieved using the process described by the flowchart of FIG. 8.

Figure 10:
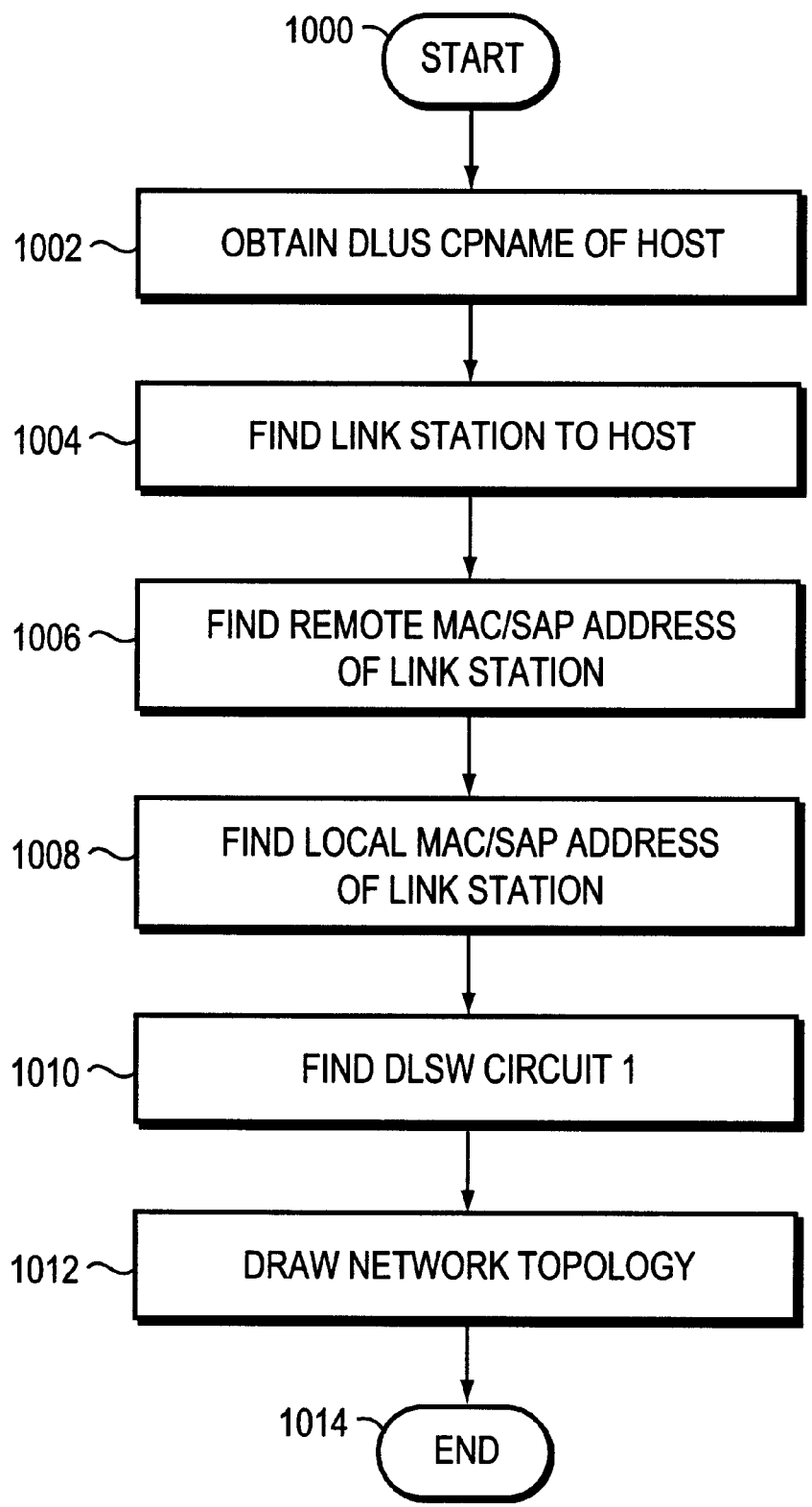
FIG. 10 is a flowchart illustrating the steps involved in the novel correlation process for the host-side circuit of the alternate embodiment of the mixed APPN and DLSw network.

FIG. 10 is a flowchart illustrating the steps involved in the novel correlation process for the host-side circuit of the alternate embodiment of the mixed APPN and DLSw network. The process begins at Step 1000 and proceeds to Step 1002 where the DLUS CP name of the host is obtained from the DLUR MIB (e.g., dlurPuActiveDlusName). Given a PU name, the CP name at the other end of the link station connection is that of the DLUS (host). In the illustrative embodiment, the CP name of the DLUS is preferably NETID.DLUS.

Once the DLUS CP name is obtained, Step 1004 involves searching the appnLsTable database (Step 814) to find the link station to the host having a matching remote (PU) CP name. In Step 1006, the remote MAC/SAP address of the link station is determined as in Step 818. That is, the link table in the APPN MIB has the remote MAC/SAP address of the link, which is the MAC/SAP address of the host. Step 1008 involves determining the local MAC/SAP address of the link station; the local MAC/SAP address is the address of the port used for the host link at the DLSw/APPN router. A different port may be used for the host-side portion of the DLSw circuit; therefore, it should not be assumed that the same local MAC/SAP address is used for the remote-side of the circuit.

Given the local MAC/SAP and remote MAC/SAP addresses, the technique proceeds to determine the DLSw circuit in Step 1010. In the case of the hybrid DLSw/APPN router, its local MAC/SAP address is the DLUR portion of the router and its remote MAC/SAP address is that of the host. For the DLSw host router, its local MAC/SAP address is that of the host and its remote MAC/SAP address is that of the DLUR router. Therefore, the inventive technique may be used to determine the MAC/SAP address pairs of the DLSw circuits for the host-side and remote-side portions of the network (which are different sets of MAC/SAP address pairs) and, thus in Step 1012, the network topology may be drawn. The process then ends in Step 1014.

The information collected by the CiscoWorks Blue Maps and CiscoWorks Blue SNA View tools are correlated according to the inventive technique to enable management of a network having a particular topology. The information is collected by the NMS 580 and stored on databases of tables that are accessed by a core Maps process executing on the NMS to draw the network topology upon demand. The SNA View tool is used to acquire information from the host (VTAM), but the Maps tool actually draws the view of the network topology on the NMS display; therefore, the inventive correlation technique may be considered an extension to the CiscoWorks Blue Maps product.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently correlating information pertaining to System Network Architecture (SNA) host and physical unit (PU) entities of a mixed Advanced Peer to Peer Networking (APPN) and Data Link Switching (DLSW) computer network having a local DLSw device associated with an APPN device and further configured in a peer connection relationship with a remote DLSw device, the peer connection relationship including a DLSw circuit, the method comprising the steps of:

identifying a SNA session path as using Dependent Logical Unit Requester (DLUR) services of the APPN device;

obtaining media access control (MAC)/service access point (SAP) addresses pertaining to the DLUR services of the APPN device and PU;

determining the order of the peer DLSw devices in the network; and drawing the topology of the entities and devices in the computer network.

2. The method of claim 1 wherein the step of identifying comprises the step of indicating whether the APPN device performs DLUR services for the PU through a virtual telecommunication access method (VTAM) display of the PU at a network management station (NMS).

3. The method of claim 2 wherein the step of identifying further comprises the step of, if the APPN device provides DLUR services, retrieving a DLUR name from VTAM, wherein the DLUR name is of the form NETID.CP name.

4. The method of claim 3 further comprising the step of acquiring SNA-specific information at the NMS from a VTAM table at the host entity over a pipe connection.

5. The method of claim 4 wherein the SNA-specific information includes (i) the MAC/SAP addresses of the DLUR services of the APPN device; (ii) a DLUR name for the PU, (iii) a control point (CP) name of the PU; and (iv) an ID block number/ID number (IDBLK/IDNUM) of the PU.

6. The method of claim 5 wherein the step of identifying further comprises the steps of:

determining whether the APPN device is a manageable router; and if so, correlating the DLUR name of the router to an Internet Protocol (IP) address.

7. The method of claim 6 wherein the step of determining whether the APPN device is a manageable router comprises the step of determining whether the router responds to a query from the NMS with requested information.

8. The method of claim 7 wherein the query is a simple network managment protocol (SNMP) query using an APPN management information base (MIB) and wherein the requested information is a CP name of the router.

9. The method of claim 8 further comprising the step of providing the NMS with a list of IP addresses of the devices including the router.

10. The method of claim 9 wherein the step of determining whether the router responds to the query comprises the step of responding to the query with the CP name of the router, the CP name being a NETID.CP name.

11. The method of claim 10 wherein the router is an APPN/DLSw router wherein the step of correlating comprises the step of correlating the NETID.CP name with an IP address of the APPN/DLSw router.

12. The method of claim 11 wherein the step of identifying farther comprises the step of finding a link station between the APPN/DLSw router and the PU.

13. The method of claim 12 wherein the step of finding comprises the step of querying the APPN/DLSw router using a DLUR MIB that includes a field with contents identifying the link station.

14. The method of claim 13 wherein the contents comprise a dlurPuLsName.

15. The method of claim 12 wherein the step of finding comprises the step of matching the CP name of the PU with a CP name associated with the link station contained in an APPN MIB.

16. The method of claim 15 wherein the CP name associated with the link station is an appnLsAdjCpName contained in an appnLsTable structure of the APPN MIB.

17. The method of claim 12 wherein the step of finding comprises the step of matching the IDBLK/IDNUM of the PU with an appnLsPartnerNodeId entry associated with the link station and contained in an appnLsTable structure of the APPN MIB.

18. The method of claim 14 wherein the step of obtaining comprises the step of obtaining MAC/SAP addresses of the link station associated with the PU and APPN/DLSw router from the APPN MIB.

19. The method of claim 18 wherein the MAC/SAP address of the link station associated with the PU is a remote MAC/SAP address for the DLSw circuit and wherein the MAC/SAP address of the APPN/DLSw router a local MAC/SAP address for the DLSw circuit.

20. The method of claim 19 wherein the step of determining the order of the DLSw devices comprises the step of identifying the APPN/DLSw router as a router coupled to a host-side of the network.

* * * * *